US010607089B2

(12) United States Patent
Brown et al.

(10) Patent No.: US 10,607,089 B2
(45) Date of Patent: *Mar. 31, 2020

(54) RE-IDENTIFYING AN OBJECT IN A TEST IMAGE

(71) Applicant: International Business Machines Corporation, Armonk, NY (US)

(72) Inventors: Lisa M. Brown, Pleasantville, NY (US); Ankur Datta, White Plains, NY (US); Rogerio S. Feris, White Plains, NY (US); Sharathchandra U. Pankanti, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/199,283

(22) Filed: Nov. 26, 2018

(65) Prior Publication Data

US 2019/0095719 A1 Mar. 28, 2019

Related U.S. Application Data

(63) Continuation of application No. 15/471,595, filed on Mar. 28, 2017, now Pat. No. 10,169,664, which is a (Continued)

(51) Int. Cl.
*G06K 9/00* (2006.01)
*G06T 7/194* (2017.01)
(Continued)

(52) U.S. Cl.
CPC ....... *G06K 9/00771* (2013.01); *G06K 9/6212* (2013.01); *G06T 7/194* (2017.01);
(Continued)

(58) Field of Classification Search
CPC .. G06K 9/00771; G06K 9/6212; G06T 7/194; G06T 2207/30232; G06T 2207/20081; G08B 13/19613
(Continued)

(56) References Cited

U.S. PATENT DOCUMENTS 6,373,968 B2 4/2002 Okano et al.
6,963,364 B2 11/2005 Haese et al.
(Continued)

FOREIGN PATENT DOCUMENTS

WO 2009018403 2/2009
WO 2010045404 4/2010

OTHER PUBLICATIONS

Amendment filed Jun. 8, 2016 in response to Office Action (dated Mar. 8, 2016) for U.S. Appl. No. 15/471,595; Filing Date Mar. 28, 2017; Confirmation No. 9552.
(Continued)

*Primary Examiner* — Zaihan Jiang
(74) *Attorney, Agent, or Firm* — Schmeiser, Olsen & Watts; William H. Hartwell

(57) ABSTRACT

An approach for re-identifying an object in a test image is presented. Similarity measures between the test image and training images captured by a first camera are determined. The similarity measures are based on Bhattacharyya distances between feature representations of an estimated background region of the test image and feature representations of background regions of the training images. A transformed test image based on the Bhattacharyya distances has a brightness that is different from the test image's brightness and matches a brightness of training images captured by a second camera. An appearance of the transformed test image resembles an appearance of a capture of the test image by the second camera. Another image included in test images
(Continued)

captured by the second camera is identified as being closest in appearance to the transformed test image and another object in the identified other image is a re-identification of the object.

18 Claims, 5 Drawing Sheets

Related U.S. Application Data continuation of application No. 13/647,645, filed on Oct. 9, 2012, now Pat. No. 9,633,263.

(51) Int. Cl.
*G06K 9/62* (2006.01)
*G08B 13/196* (2006.01)

(52) U.S. Cl.
CPC .............. *G06T 2207/20081* (2013.01); *G06T 2207/30232* (2013.01); *G08B 13/19613* (2013.01)

(58) Field of Classification Search
USPC .......................................................... 348/159
See application file for complete search history.

(56) References Cited

U.S. PATENT DOCUMENTS

| | | | |
|---|---|---|---|
| 7,133,083 B2 | 11/2006 | Jaynes et al. | |
| 7,450,735 B1* | 11/2008 | Shah | G06T 7/292 348/143 |
| 7,711,146 B2 | 5/2010 | Tu et al. | |
| 7,953,251 B1* | 5/2011 | Steinberg | G06K 9/0061 382/103 |
| 8,165,397 B2 | 4/2012 | Doretto et al. | |
| 8,212,812 B2 | 7/2012 | Tsin et al. | |
| 9,633,263 B2* | 4/2017 | Brown | G06K 9/00771 |
| 2006/0102843 A1* | 5/2006 | Bazakos | G06K 9/00255 250/339.05 |
| 2006/0104488 A1* | 5/2006 | Bazakos | G06K 9/00255 382/118 |
| 2006/0221201 A1 | 10/2006 | Chien | |
| 2008/0031493 A1* | 2/2008 | Brogren | G06K 9/00369 382/103 |
| 2008/0082426 A1 | 4/2008 | Gokturk | |
| 2009/0190798 A1* | 7/2009 | Lee | G06K 9/00201 382/103 |
| 2010/0201808 A1 | 8/2010 | Hsu | |
| 2010/0246940 A1 | 9/2010 | Lin | |
| 2011/0087677 A1* | 4/2011 | Yoshio | G08B 13/19613 707/749 |
| 2011/0095908 A1 | 4/2011 | Nadeem | |
| 2011/0156924 A1 | 6/2011 | Nadeem | |
| 2012/0056982 A1 | 3/2012 | Katz | |
| 2012/0099788 A1 | 4/2012 | Bhatti | |
| 2012/0249745 A1* | 10/2012 | Gagel | G06T 15/20 348/46 |
| 2013/0021496 A1* | 1/2013 | Ranbro | H04N 9/735 348/223.1 |
| 2013/0163833 A1* | 6/2013 | Wang | G07C 9/00158 382/118 |
| 2013/0243250 A1 | 9/2013 | France | |
| 2013/0300911 A1 | 11/2013 | Beckman | |
| 2013/0343642 A1* | 12/2013 | Kuo | G06K 9/6256 382/159 |
| 2014/0055609 A1 | 2/2014 | Fan | |
| 2014/0055690 A1* | 2/2014 | Song | G02F 1/13338 349/12 |
| 2014/0098221 A1 | 4/2014 | Brown | |
| 2017/0200051 A1 | 7/2017 | Brown | |

OTHER PUBLICATIONS

Amendment filed Sep. 29, 2015 in response to Office Action (dated Jul. 15, 2015) for U.S. Appl. No. 13/647,645; Filing Date Oct. 9, 2012; Confirmation No. 9356.

Amendment filed Nov. 10, 2016 in response to Office Action (dated Aug. 12, 2016) for U.S. Appl. No. 13/647,645; Filing Date Oct. 9, 2012; Confimation No. 9356.

B. Prosser, S. Gong, and T. Xiang, Multi-camera Matching using Bi-Directional Cumulative Brightness Transfer Functions, Proceedings of the British Machine Vision Conference (BMVC), 2008, 4 pages.

Berdugo et al., Object Reidentification in Read World Scenarios Across Multiple Non-Overlapping Cameras, Signal and Image Processing Laboratory (SIPL) Dept. of Electrical Engineering, Techion—Israel Institute of Technology, 32000, Haifa, Israel, 5 pages.

Cheng et al., Custom Pictorial Structures for Re-identification. In Jesse Hoey, Stephen McKenna and Emanuele Trucco, Proceedings of the British Machine Vision Conference, pp. 68.1-68.11. BMVA Press, Sep. 2011, 11 pages.

Datta et al., Appearance Modeling for Person Re-Identification using Weighted Brightness Transfer Functions, 4 pages.

Faith Porikli "Inter-Camera Color Calibration by Cross-Correlation Model Function", IEEE International Conference on Image Processing (ICIP), Sep. 2003 (IEEE Xplore), 4 pages.

Farenzena et al., Person re-identification by symmetry-driven accumulation of local features. IEEE Conference on Computer Vision and Pattern Recognition (CVPR), 2010 , 8 pages.

Final Office Action (dated Dec. 31, 2015) for U.S. Appl. No. 13/647,645; Filing Date Oct. 9, 2012; Confirmation No. 9356.

Gray et al., Evaluating Appearance Models for Recognition, Reacquisition, and Tracking, in Proc. IEEE International Workshop on Performance Evaluation for Tracking and Surveillance (PETS), Oct. 2007, 7 pages.

Gray et al., Viewpoint Invariant Pedestrian Recognition with an Ensemble of Localized Features, ECCV '08: Proceedings of the 10th European Conference on Computer Vision, 14 pages.

Grossberg et al., Determining the camera response from images: what is knowable? IEEE Transactions on Pattern Analysis and Machines Intelligence, Nov. 2003, pp. 1455-1467.

Javed et al., Appearance modeling for tracking in multiple non-overlapping cameras. IEEE Computer Society Conferance on Computer Vision and Pattern Recognition, 2005 (CVPR 2005), 8 pages.

Notice of Allowance (dated Sep. 21, 2018) for U.S. Appl. No. 15/471,595; Filing Date Mar. 28, 2017; Confirmation No. 9552.

Notice of Allowance (dated Dec. 19, 2016) for U.S. Appl. No. 13/647,645; Filing Date Oct. 9, 2012; Confirmation No. 9356.

Office Action (dated Mar. 8, 2016) for U.S. Appl. No. 15/471,595; Filing Date Mar. 28, 2017; Confirmation No. 9552.

Office Action (dated Jul. 15, 2015) for U.S. Appl. No. 13/647,645; Filing Date Oct. 9, 2012; Confirmation No. 9356.

Office Action (dated Aug. 12, 2016) for U.S. Appl. No. 13/647,645; Filing Date Oct. 9, 2012; Confirmation No. 9356.

Preliminary Amendment and Request for Continued Examination filed Mar. 31, 2016 for U.S. Appl. No. 13/647,645; Filing Date Oct. 9, 2012; Confirmation No. 9356.

Prosser et al., Person Re-Identification by Support Vector Ranking. Proceedings of the British Machine Vision Conference, pp. 21.1-21.11. BMVA Press, Sep. 2010, 11 pages.

Response After Final filed Feb. 29, 2016 in response to Final Office Action (dated Dec. 31, 2015) for U.S. Appl. No. 13/647,645; Filing Date Oct. 9, 2012; Confirmation No. 9356.

Schwartz et al., Learning Discriminative Appearance-Based Models Using Partial Least Squares. XXII Brazilian Symposium on Computer Graphics and Image Processing (SIBGRAPH), 2009, 8 pages.

Shi et al., Normalized Cuts and Image Segmentation, IEEE Transactions on Pattern Analysis and Machine Intelligence (PAMI), vol. 22, No. 8, Aug. 2000, pp. 888-905.

(56) References Cited

OTHER PUBLICATIONS

Zheng et al., Person Re-identification by Probabilistic Relative Distance Comparison, IEEE Conf. on Computer Vision and Pattern Recognition, 2011, pp. 649-656.

* cited by examiner

RE-IDENTIFYING AN OBJECT IN A TEST IMAGE

CROSS REFERENCE TO RELATED APPLICATIONS

This application is a continuation application claiming priority to Ser. No. 15/471,595 filed Mar. 28, 2017, now U.S. Pat. No. 10,169,664 issued Jan. 1, 2019, which is a continuation application claiming priority to Ser. No. 13/647,645 filed Oct. 9, 2012, now U.S. Pat. No. 9,633,263 issued Apr. 25, 2017, the contents of which are hereby incorporated by reference.

TECHNICAL FIELD

The present invention generally relates to image processing, and more specifically to object re-identification.

BACKGROUND

An area under surveillance often includes more than one camera to cover different locations. Different cameras have different inherent levels of brightness and different locations have different levels of illumination, thereby making the same object (e.g., person or vehicle) appear brighter in one image from one camera than in another image from another camera. Because the same object appears brighter in one image than another, re-identification of an object has been difficult. Re-identification refers to identifying that an object imaged by one camera is the same as an object imaged by another camera. Known re-identification approaches adjust for brightness from one camera to the next camera by averaging equally weighted transfer functions or by determining a transfer function based on equally weighted observations.

BRIEF SUMMARY

An embodiment of the present invention is a system, method and program product for re-identifying an object. Brightness transfer functions (BTFs) between respective pairs of training images captured by first and second cameras are determined. Respective measures of similarity between the first test image and each of the training images captured by the first camera are determined. Based on the measures of similarity, weights of the training images captured by the first camera are determined. The weights correspond to the BTFs. A weighted brightness transfer function (WBTF) is determined by weighting the BTFs by the corresponding weights and combining the weighted BTFs. Based on the WBTF, the first test image is transformed to better match one of the training images captured by the second camera. Another test image, captured by the second camera, is identified. The identified test image is closer in appearance to the transformed test image than other test images captured by the second camera. An object in the identified test image is designated as a re-identification of the object in the first test image.

Brightness transfer functions (BTFs) are determined. Each BTF maps between first and second training images that are included in a corresponding pair of training images, and that are captured by first and second cameras, respectively. Feature distances are determined between the test image and each training image captured by the first camera. The test image is captured by the first camera and each training image is included in the pairs of training images. Based on the feature distances, the computer determines weights of the training images captured by the first camera. The weights correspond to the BTFs. A weighted brightness transfer function (WBTF) is determined by weighting the BTFs by the corresponding weights and combining the weighted BTFs. Based on the WBTF, the computer transforms the test image so that the transformed test image resembles the second training images captured by the second camera. An appearance of another test image (closest matching image) included in test images captured by the second camera is determined to have a closeness to an appearance of the transformed test image that exceeds a closeness of an appearance of any other test image captured by the second camera to the appearance of the transformed test image. An object in the closest matching image is designated as a re-identification of the object in the test image.

Embodiments of the present invention uses a weighted brightness transfer function to accurately transfer appearance information while addressing severe lighting changes and a substantial number of appearance variations across multiple cameras. Embodiments of the present invention may provide an improved tracking system for surveilling people or vehicles across multiple cameras or for tracking objects as they move in shipping scenarios from one camera to the next camera. The improved tracking system need multiple images per person or per vehicle prior to re-identification, and does not need to be a closed system that includes a pre-stored dictionary of people or vehicles that must be identified prior to re-identification. Embodiments of the present invention may provide a traffic management system in which re-identification computes time of travel between two cameras without requiring the use of any invasive technology such as Bluetooth®.

DETAILED DESCRIPTION

Overview

Embodiments of the present invention re-identifies an object across multiple images generated by multiple cameras by using a Weighted Brightness Transfer Function (WBTF) to transform the appearance of a test image to adjust for a variation in the brightness of the object between a first camera and a second camera. The WBTF is determined by (1) brightness transfer functions (BTFs) corresponding to pairs of training images from the first and second cameras; and (2) unequal weights assigned to training images from the first camera, where the weights are based on the distances in feature space between a test image and the training images.

The aforementioned variation in brightness can be caused by many factors, such as the transit of the sun across the sky, the transition from night to day or day to night, a change between natural lighting and artificial illumination, a change in natural lighting due to a change in weather conditions, a change to reflectivity of surfaces due to precipitation, a change between artificial illumination being on and off, and a change in headlights on vehicles being on and off. In addition, brightness variation caused by the transit of the sun can change throughout the year as a result of the precession of the Earth's axis relative to the sun.

Embodiments of the present invention also provide a high-dimensional signature of color and texture features for the purpose of image matching.

System for Re-Identifying an Object

Figure 1:
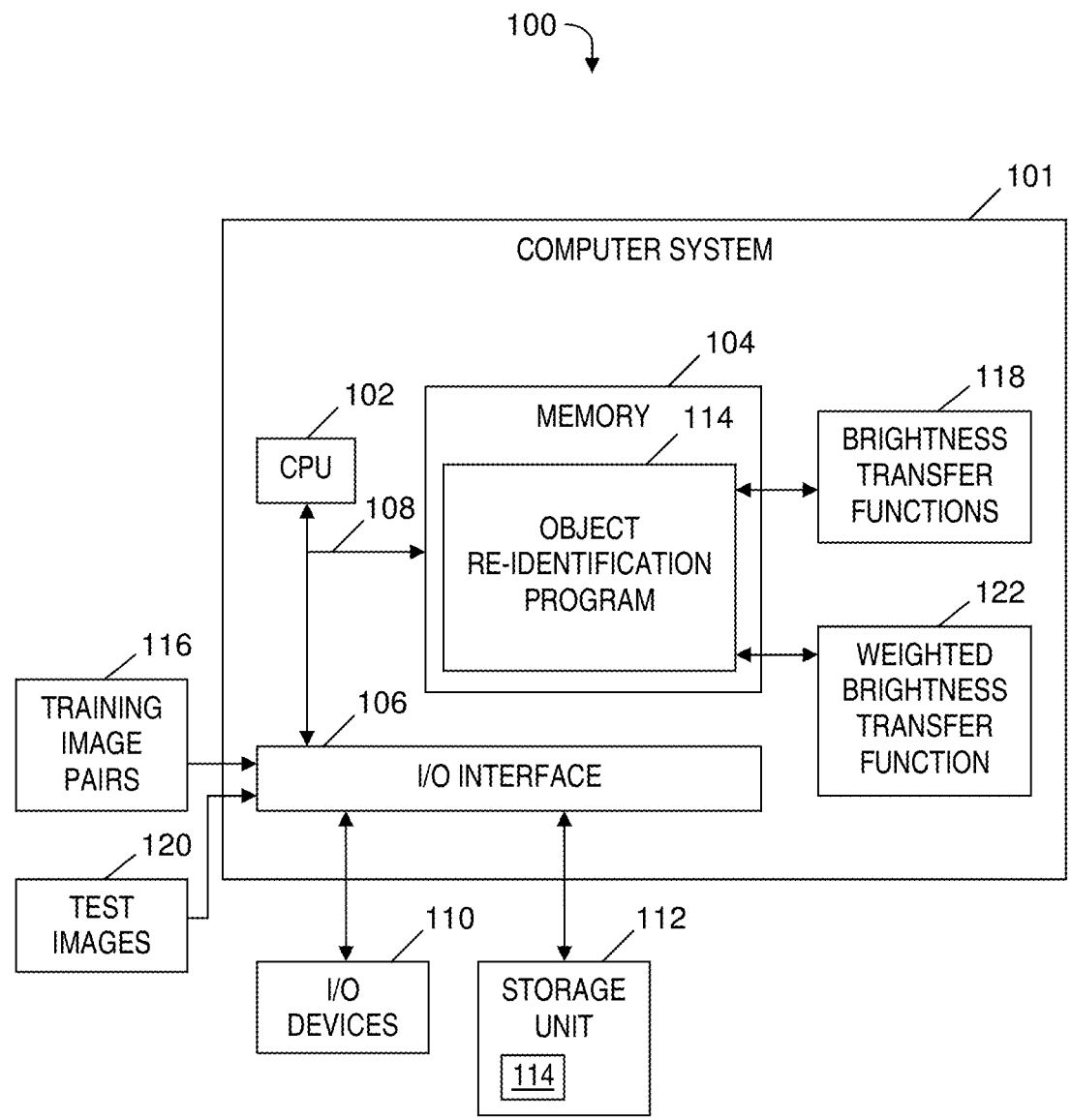
FIG. 1 is a block diagram of a system for re-identifying an object across images generated by multiple imaging devices, in accordance with embodiments of the present invention.

FIG. 1 is a block diagram of a system for re-identifying an object across images generated by multiple imaging devices, in accordance with embodiments of the present invention. System 100 includes a computer system 101, which generally comprises a central processing unit (CPU) 102, a memory 104, an input/output (I/O) interface 106, and a bus 108. Further, computer system 101 is coupled to I/O devices 110 and a computer data storage unit 112. CPU 102 executes object re-identification program 114 stored in disk storage 112 via memory 104 to re-identify an object across multiple images generated by multiple cameras. Computer system 101, CPU 102, memory 104, I/O interface 106, bus 108, I/O devices 110, storage unit 112 and object-re-identification program 114 are further described in the section entitled Computer System presented below.

Via I/O interface 106, object re-identification program 114 receives training image pairs 116, each pair including one training image acquired by a first camera (not shown) and one training image acquired by a second camera (not shown). The training images acquired by the first camera are images of objects in a first region and the training images acquired by the second camera are images of objects in a second region. The first and second regions have different lighting conditions, which causes a variation in brightness of objects in the first and second regions. In one embodiment, the first and second regions are first and second surveillance regions that represent physical environments of which surveillance is desired. For example, the first region may be an area in a subway station and the second region may include a portion of a sidewalk along a city street, where the lighting conditions of the subway station include an illumination by artificial lighting and at times may include the headlight of a subway train, and where the lighting conditions of the sidewalk includes natural lighting during the day.

Based on training image pairs 116, object re-identification program 114 determines brightness transfer functions (BTFs) 118, each BTF corresponding to one of training image pairs 116.

Via I/O interface 106, object re-identification program 114 receives test images 120, which includes multiple images captured by the first camera and multiple images captured by the second camera. Based on BTFs 118 and based on weights (not shown) assigned to the training images captured by the first camera, object re-identification program 114 determines a Weighted Brightness Transfer Function (WBTF) 122. The object re-identification program 114 uses WBTF 122 to transform a test image captured by the first camera so that its appearance more closely resembles how the second camera would have captured the same test image. The object re-identification program 114 compares the transformed test image captured by the first camera to the test images captured by the second camera, and determines which test image captured by the second camera is the closest match to the transformed test image.

Each of the first and second cameras may be a digital camera, such as standard outdoor or indoor digital surveillance camera capable of surveilling a physical environment when the camera is in a fixed orientation or when operating in a sweep mode. The camera is capable of transmitting digital information corresponding to the images captured by the camera. The transmitted digital information may correspond to, for example, a video stream, a series of images captured at regular time intervals, or images captured as a result of a triggering event occurring in the region under surveillance, such as detected motion or changes in a visual aspect.

The functionality of components of system 100 is further described below in the discussion relative to FIGS. 2A-2B and in the section entitled Computer System.

Process for Re-Identifying an Object

Figure 2A:
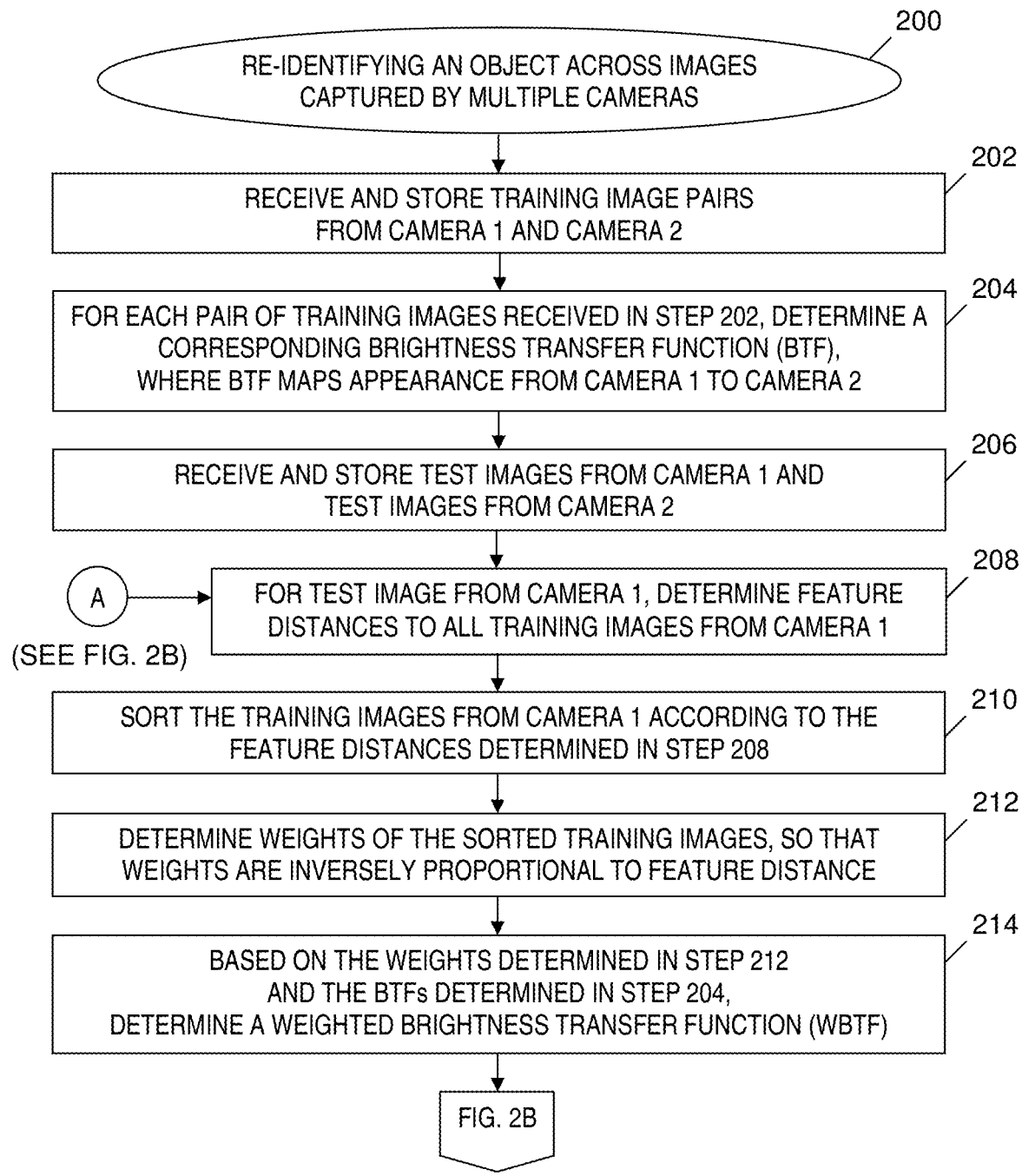
FIGS. 2A-2B depict a flowchart of an object re-identification program executed in a computer system included in the system of FIG. 1, in accordance with embodiments of the present invention.
Figure 2B:
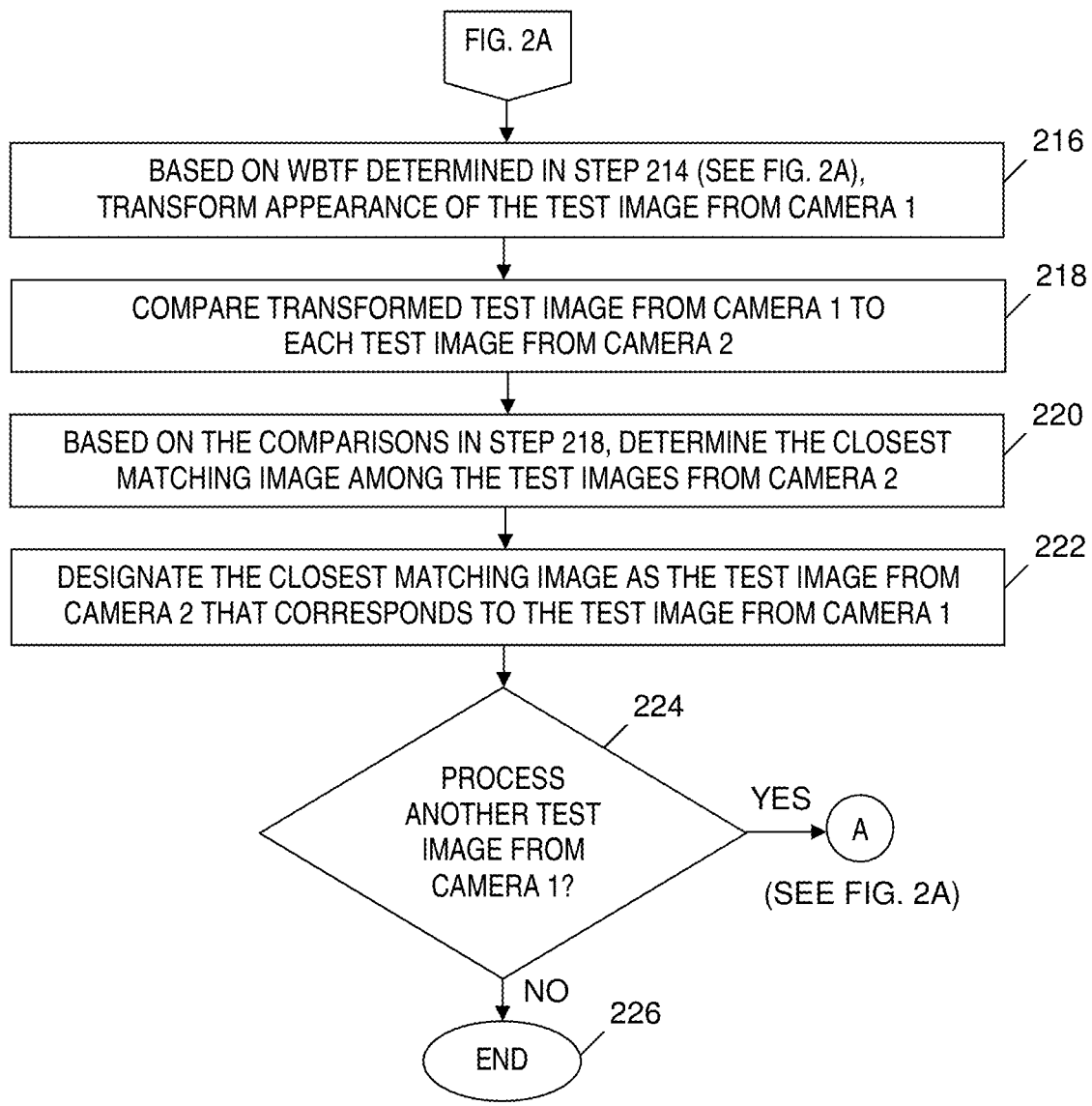

FIGS. 2A-2B depict a flowchart of object re-identification program 114 (see FIG. 1) executed in computer system 101 (see FIG. 1) included in the system of FIG. 1, in accordance with embodiments of the present invention. The process of FIGS. 2A-2B starts at step 200 in FIG. 2A. In step 202, object re-identification program 114 (see FIG. 1) receives training image pairs 116 (see FIG. 1). Object re-identification program 114 (see FIG. 1) stores the received training image pairs 116 (see FIG. 1) in a data repository. Each training image pair received in step 202 includes a training image of an object captured by a first camera and a training image of the same object captured by a second camera. The lighting conditions that affect the brightness of the training image captured by the first camera differ from the lighting conditions that affect the brightness of the training image captured by the second camera. In one embodiment, each training image pair received in step 202 includes images of a particular, corresponding person viewed from the first and second cameras.

In step 204, for each pair of training images included in training image pairs 116 (see FIG. 1), object re-identification program 114 (see FIG. 1) determines a corresponding BTF 118 (see FIG. 1) (i.e., a corresponding appearance transfer function), so that the BTF 118 (see FIG. 1) maps the appearance of the training image captured by the first camera to the appearance of the training image captured by the second camera. In one embodiment, object re-identification program 114 (see FIG. 1) determines a corresponding BTF 118 (see FIG. 1) in step 204 by mapping the foreground region of the training image captured by the first camera to the foreground region of the training image captured by the second camera.

A training mode of the process of FIGS. 2A-2B includes steps 202 and 204. The training mode does not include staging a known object moving from a surveillance region of one camera to another surveillance region of another camera.

In one embodiment, object re-identification program 114 (see FIG. 1) determines a BTF $H_i^j$ for a training image pair in step 204 as described below.

Determining a BTF for a Training Image Pair:

The object re-identification program 114 (see FIG. 1) receives a pair of object observations $O_i$ and $O_j$ in training image pairs 116 (see FIG. 1), corresponding to the same observation from two cameras $C_i$ and $C_j$. The BTF $H_i^j$ transfers a brightness value $B_i$ in $O_i$ to its corresponding brightness value $B_j$ in $O_j$, according to equation (1) presented below.

$$B_j = H_i^j(B_i) \qquad (1)$$

Pixel to pixel correspondences between $O_i$ and $O_j$ cannot be used to calculate $H_i^j$ for person re-identification due to self-occlusions and viewpoint changes; therefore, object re-identification program 114 (see FIG. 1) calculates $H_i^j$ by employing normalized cumulative histograms of object brightness values under the assumption that the percentage of brightness values less than or equal to $B_i$ in $O_i$ is equal to the percentage of brightness values less than or equal to $B_j$ in $O_j$. It should be noted that object observations $O_i$ and $O_j$ correspond only to the areas of the image that represent the object (e.g., person). The object re-identification program 114 (see FIG. 1) designates $H_i$ and $H_j$ as the normalized cumulative brightness histograms of observations $O_i$ and $O_j$, respectively, and determines $H_i$ and $H_1$ according to equation (2):

$$H_i(B_i) = H_j(B_j) = H_j(H_i^j(B_i)) \quad (2)$$

The object re-identification program 114 (see FIG. 1) determines BTF $H_i^j$ according to equation (3):

$$H_i^j(B_i) = H_j^{-1}(H_i(B_i)) \quad (3)$$

$H^{-1}$ in equation (3) is the inverted cumulative histogram. In the case of a color image, object re-identification program 114 (see FIG. 1) transforms each color channel separately. The object re-identification program 114 (see FIG. 1) performs the aforementioned computations in equations (1), (2) and (3) for each training image pair 116 (see FIG. 1) in step 204, so that each training image pair is associated with a corresponding BTF $H_i^j$.

In one embodiment, object re-identification program 114 (see FIG. 1) determines a BTF in step 204 for the object that moves from the surveillance region of one camera to the surveillance region of another camera. The object re-identification program 114 (see FIG. 1) determines the BTF for each color and each texture (i.e., fabric texture or other material texture) because the brightness variation between the training images is not uniform for all colors and textures. Therefore, object re-identification program 114 (see FIG. 1) determines the BTF so that the brightness of one color and one texture is adjusted differently than the brightness of another color and another texture when attempting to correlate test images captured by the different cameras.

In one embodiment, object re-identification program 114 (see FIG. 1) stores in step 202 only pairs of training images in which the images in each pair present the same view (e.g., one training image pair includes two images that have a front view and a second training image pair includes two images that have a side view), as determined by an overall similarity of the two images in each training image pair. In this embodiment, the pairs of training images that include images that present the same view are the only training image pairs used in step 204 to determine the BTFs 118 (see FIG. 1).

Testing Mode:

The training mode ends with the performance of step 204, and a testing mode of the process of FIGS. 2A-2B starts at step 206. In step 206, object re-identification program 114 (see FIG. 1) receives test images 120 (see FIG. 1), which includes multiple test images captured by the first camera and multiple test images captured by the second camera. Object re-identification program 114 (see FIG. 1) stores the received test images 120 (see FIG. 1) in a data repository.

In one embodiment, object re-identification program 114 (see FIG. 1) receives and stores in step 206 N test images captured by the first camera and N test images captured by the second camera.

In one embodiment, object re-identification program 114 (see FIG. 1) receives test images 120 (see FIG. 1) without having knowledge of which test image captured by the second camera corresponds to a given test image captured by the first camera.

As one example, for a test image T that includes Person X, where test image T is captured by the first camera, the object re-identification program 114 (see FIG. 1) receives and stores test image T while not having knowledge of which of the N test images captured by the second camera includes Person X and therefore matches test image T.

In step 208, object re-identification program 114 (see FIG. 1) selects a test image from the multiple test images captured by the first camera, and for the selected test image, object re-identification program 114 (see FIG. 1) determines feature distances to all training images captured by the first camera. Each feature distance is a measure of similarity of appearance between the selected test image and a respective training image captured by the first camera, where the training image is included in training image pairs 116 (see FIG. 1). In one embodiment, the aforementioned similarity of appearance is within a predetermined threshold limit that is received by object re-identification program 114 (see FIG. 1) prior to step 208.

In one embodiment, object re-identification program 114 (see FIG. 1) determines a feature distance as described below.

Determining a Feature Distance:

Object re-identification program 114 (see FIG. 1) receives a test image $O_i^T$ captured by camera $C_i$, where test image $O_i^T$ is included in test images 120 (see FIG. 1) received in step 206. Object re-identification program 114 (see FIG. 1) segments test image $O_i^T$ into estimated foreground and background image regions, $O_i^T(p)$ and $O_i^T(\bar{p})$, respectively. The foreground region includes the object (e.g., person) being re-identified in the process of FIGS. 2A-2B. The background region is the portion of the test image that does not include the object (e.g., the non-person region).

In one embodiment, object re-identification program 114 (see FIG. 1) estimates the foreground (F) and background (B) regions by over-segmenting the test image $O_i^T$ into $S_i$ segments by using normalized cuts, as described in J. Shi and J Malik, *Normalized cuts and image segmentation*, Institute of Electrical and Electronics Engineers (IEEE) Transactions on Pattern Analysis and Machine Intelligence, 2000. In one embodiment, object re-identification program 114 (see FIG. 1) performs the segmentation under the assumption that the object (e.g., person) is centered in the test image, and therefore initializes the foreground model ($F^{S_i}$) using segments that lie in the center of the test image and initializes the background model by using segments at the four corners of the test image or by using other segments that do not lie in the center of the test image. The object re-identification program 114 (see FIG. 1) determines a binary label for the remaining segments according to equations (4) and (5) presented below.

$$\Delta = (1-\eta)\frac{1}{E(S_i, F^{S_i})} + \eta\frac{1}{\rho(S_i, F^{S_i})},$$

$$P(S_i = F) = 1 \text{ if } \Delta \geq \epsilon, 0 \text{ otherwise}, \quad (4)$$

$$P(S_i = B) = 1 - P(S_i = F) \quad (5)$$

The object re-identification program 114 (see FIG. 1) determines $E(S_i, F^{S_i})$ and $\rho(S_i, F^{S_i})$ for equations (4) and (5)

as the minimum Euclidean and Bhattacharyya distances, respectively, between the center of $S_i$ and any of the segments that lie in the foreground model ($F^{S_i}$).

Following the segmentation into foreground and background regions by using the aforementioned binary label, object re-identification program 114 (see FIG. 1) determines a set $D^H$ of K BTFs associated with K training images $O_i(\tilde{p})$ according to equation (6) presented below.

$$D^H = \{(^kH_i^j | \alpha_k = \psi(O_i^T(\tilde{p}), O_i(\tilde{p})), \alpha_k \leq \delta\},$$

$$|D^H| = K \qquad (6)$$

The K training images $O_i(\tilde{p})$ are included in training image pairs 116 (see FIG. 1). As indicated in equation (6) presented above, the background areas of the K training images are at most $\delta$ distance away in the feature space from the background areas of the test image $O_i^T(\tilde{p})$. In equation (6), $\psi$ is the Bhattacharyya distance between feature representations of the test image $O_i^T(\tilde{p})$ and training image $O_i(\tilde{p})$. The object re-identification program 114 (see FIG. 1) receives the $\delta$ distance (i.e., a threshold distance) prior to step 208.

In one embodiment, the object re-identification program 114 (see FIG. 1) determines a feature representation of the test image or the training image by dividing the image into m equal horizontal stripes, where m is an integer, m>1 and each horizontal stripe includes a number of rows of pixels that is wide enough to include each major component of the object being re-identified by the process of FIGS. 2A-2B. For example, m=15 for a person re-identification may be selected because each stripe in a 15-stripe image is sufficiently wide to include a portion of each major body part (e.g., a portion of an arm from elbow to fingertips) at a substantially large level of granularity.

For each stripe of the m stripes, object re-identification program 114 (see FIG. 1) computes an n-dimensional histogram that includes Red-Green-Blue (RGB), Hue, Saturation and Value (HSV) and YCbCr color features, where n is in the range of 10 to 30 inclusive. The object re-identification program 114 (see FIG. 1) computes a high-dimensional Histogram of Oriented Gradients (HOG) feature histogram for each of the RGB color channels for each of the m stripes. In one embodiment, the high-dimensional HOG feature histogram is at least 400-dimensional. For example, object re-identification program 114 (see FIG. 1) computes a 405-dimensional HOG feature histogram for each of the RGB color channels for each of the m stripes. Each image is thus represented using a 12-channel high dimensional feature vector because each of RGB, HSV, YCbCr and HOG provides three channels, where each channel is obtained by concatenating features across all of the m stripes.

In an alternate embodiment, object re-identification program 114 (see FIG. 1) computes an n-dimensional histogram that includes a subset of RGB, HSV, YCbCr and HOG, so that each image is represented by feature vector based on another number of channels. For example, if object re-identification program 114 (see FIG. 1) computes the n-dimensional histogram that includes only RGB, YCbCr and HOG, then each image is represented using a 9-channel feature vector because each of the three feature representations RGB, YCbCr and HOG provides three channels.

In step 210 object re-identification program 114 (see FIG. 1) sorts the training images captured by the first camera according to the feature distances determined in step 208. The training images sorted in step 210 are included in training image pairs 116 (see FIG. 1).

In one embodiment, object re-identification program 114 (see FIG. 1) sorts the training images in step 210 based on $\psi$ in equation (6) presented above, which is the Bhattacharyya distance between the feature representations of the test image $O_i^T(\tilde{p})$ and training image $O_i(\tilde{p})$, as described above, and further based on $\alpha_k$, which is a matching cost.

In step 212, object re-identification program 114 (see FIG. 1) determines weights of the training images sorted in step 210 so the weights are based on corresponding feature distances of the training images determined in step 208. Because each training image sorted in step 210 has a corresponding BTF determined in step 204, the weights determined in step 212 are associated with the BTFs 118 (see FIG. 1) in a one-to-one correspondence. In one embodiment, the weights determined in step 212 are inversely proportional to the corresponding feature distances determined in step 208, thereby assigning lower weights to less relevant training images that do not closely resemble the test image and assigning higher weights to more relevant training images that closely resemble the test image.

In one embodiment, object re-identification program 114 (see FIG. 1) determines the weights in step 212 based on the Bhattacharyya distance between the feature representations of the test image $O_i^T(\tilde{p})$ and training image $O_i(\tilde{p})$.

In step 214, based on the weights determined in step 212 and based on the BTFs 118 (see FIG. 1) determined in step 204, object re-identification program 114 (see FIG. 1) determines WBTF 122 (see FIG. 1) by determining a weighted average of the BTFs 118 (see FIG. 1). That is, object re-identification program 114 (see FIG. 1) determines WBTF 122 (see FIG. 1) by combining the BTFs 118 (see FIG. 1), where each BTF being combined is weighted by the corresponding weight determined in step 212.

In the embodiment in which object re-identification program 114 (see FIG. 1) utilizes equation (6) to perform steps 208, 210 and 212, object re-identification program 114 (see FIG. 1) determines WBTF 122 (see FIG. 1) by defining a linear combination of all the BTFs in $D^H$, as shown in equation (7) presented below.

$$H_{WBTF} = \Sigma_{k=1}^K \alpha_k {}^k H_i^j \qquad (7)$$

By determining $H_{WBTF}$, object re-identification program 114 (see FIG. 1) assigns more weight to the BTF of those training images that are closer in appearance to the test image, instead of assigning equal weight to all the BTFs.

Step 216 in FIG. 2B is performed after step 214.

In step 216, based on the WBTF 122 (see FIG. 1) determined in step 214, object re-identification program 114 (see FIG. 1) transforms the appearance of the selected test image (i.e., the test image selected in the most recent performance of step 208) so that the appearance of the selected test image is changed to resemble how the selected test image would have appeared in a capture by the second camera. That is, object re-identification program 114 (see FIG. 1) transforms the selected test image so that the brightness of the transformed test image matches the brightness of images captured by the second camera.

In step 218, object re-identification program 114 (see FIG. 1) compares the test image transformed in step 216 to each test image captured by the second camera, which are included in test images 120 (see FIG. 1).

In one embodiment, object re-identification program 114 (see FIG. 1) in step 218 compares the foreground and background of the test image transformed in step 216 to the foreground and background, respectively, of each test image captured by the second camera.

In step 220 based on the comparisons made in step 218, object re-identification program 114 (see FIG. 1) determines the image (also known as (a.k.a.) closest matching image) among the test images captured by the second camera that most closely matches the selected test image.

In step 222, object re-identification program 114 (see FIG. 1) designates the closest matching image as the image corresponding to the test image that had been transformed in step 216 (i.e., designates the closest matching image as including the same object that is included in the test image that had been transformed in step 216).

In one embodiment, object re-identification program 114 (see FIG. 1) utilizes equation (7) to map illumination from camera $C_i$ to camera $C_j$ to transform the test image in step 216 to obtain transformed test image $\tilde{O}_i^T$. The object re-identification program 114 (see FIG. 1) subsequently defines the rank-1 re-identification problem as expression (8) presented below:

$$\operatorname*{argmin}_{j} \eta \psi(\tilde{O}_i^T(p), O_j^T(p)) + \psi(\tilde{O}_i^T(\tilde{p}), \tilde{O}_j^T(\tilde{p})) \qquad (8)$$

The two terms $\psi(\tilde{O}_i^T(p), O_j T (p))$ and $\psi(\tilde{O}_i^T(\tilde{p}), \tilde{O}_j T(\tilde{p}))$ in expression (8) represent the matching cost for foreground and background, respectively, of the transformed test image $\tilde{O}_i^T$ against all the test images $O_j^T$, $j=\{1, \ldots, N\}$. In one embodiment, the object re-identification program 114 (see FIG. 1) uses expression (8) to determine the closest matching image in step 220.

The values of $\eta$ and K in expression (8) and equation (7) may be determined empirically. As one example, $\eta=3$ and K=5.

In step 224, object re-identification program 114 (see FIG. 1) determines whether there is another test image in test images 120 (see FIG. 1) that is captured by the first camera and that has not yet been selected in step 208 (see FIG. 2A) (i.e., whether there is another test image to process). If object re-identification program 114 (see FIG. 1) determines in step 224 that there is another test image to process, then the Yes branch of step 224 is taken and the process of FIGS. 2A-2B loops back to step 208 (see FIG. 2A), which selects another test image for processing.

If object re-identification program 114 (see FIG. 1) determines in step 224 that there is not another test image to process, then the No branch of step 224 is taken and the process of FIGS. 2A-2B ends at step 226.

EXAMPLES

Figure 3:
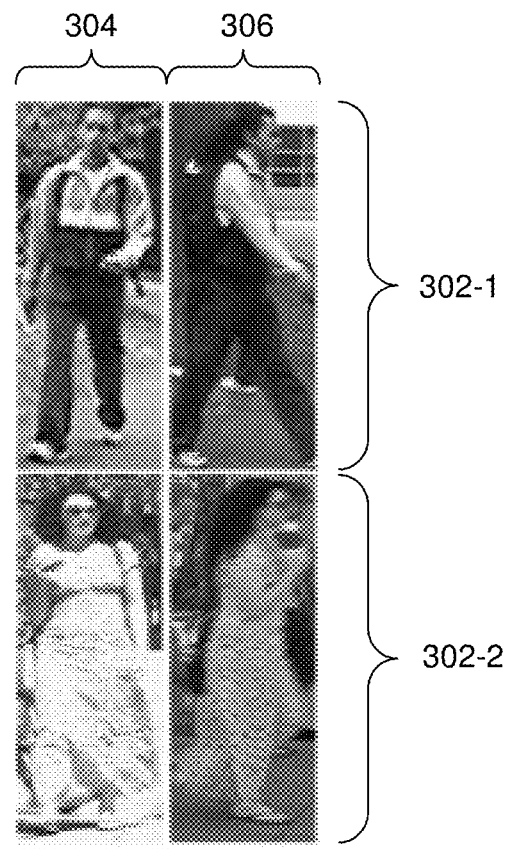
FIG. 3 depicts exemplary pairs of images used in a training stage of the program of FIGS. 2A-2B, in accordance with embodiments of the present invention.
Figure 3:
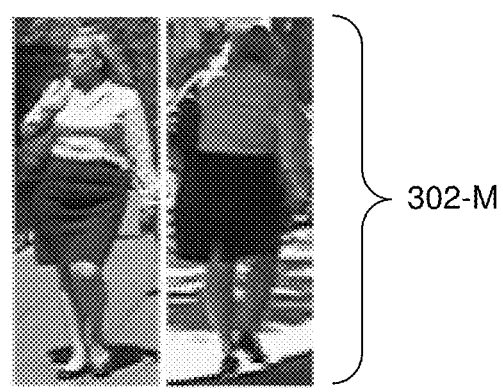

FIG. 3 depicts exemplary pairs of images used in a training stage of the program of FIGS. 2A-2B, in accordance with embodiments of the present invention. M training image pairs 302-1, 302-2, . . . , 302-M are examples of the training image pairs received in step 202 (see FIG. 2A). The M training image pairs include M training images 304 captured by a first camera and M training images 306 captured by a second camera. As shown in the training image pairs 302-1, 302-2, . . . , 302-M, the people in training images 304 appear brighter than the people in training images 306. As one example, a BTF determined in step 204 (see FIG. 2A) and corresponding to training image pair 302-1 maps the more bright image captured by the first camera (i.e., the left image in the training image pair 302-1) to the less bright image captured by the second camera (i.e., the right image in the training image pair 302-1).

Figure 4:
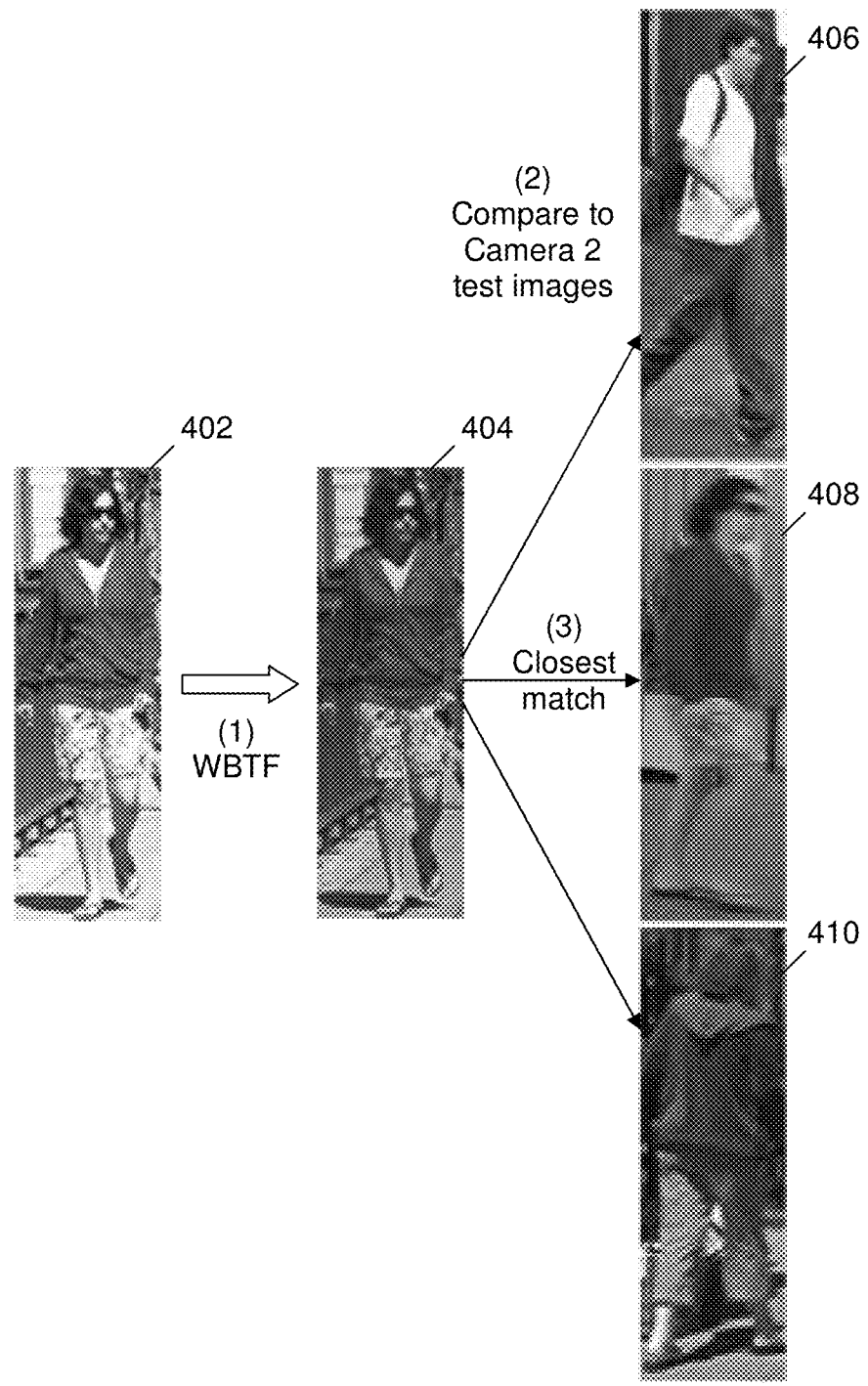
FIG. 4 depicts an example of images used in a testing stage of the program of FIGS. 2A-2B, in accordance with embodiments of the present invention.

FIG. 4 depicts an example of images used in a testing stage of the program of FIGS. 2A-2B, in accordance with embodiments of the present invention. In step (1), object re-identification program 114 (see FIG. 1) transforms an exemplary test image 402 captured by a first camera by using the WBTF 122 (see FIG. 1), which results in a transformed test image 404. In step (2), object re-identification program 114 (see FIG. 1) compares transformed test image 404 to test images 406, 408, 410, . . . captured by the second camera. In step (3), based on the comparisons performed in step (2), object re-identification program 114 (see FIG. 1) determines that the closest match to transformed test image 404 is test image 408. Steps (1), (2) and (3) may be included in steps 216, 218 and 220 respectively, in FIG. 2B.

Computer System

In one embodiment, computer system 101 in FIG. 1 implements the process of FIGS. 2A-2B. Computer system 101 generally comprises a central processing unit (CPU) 102, a memory 104, an input/output (I/O) interface 106, and a bus 108. Further, computer system 101 is coupled to I/O devices 110 and a computer data storage unit 112. CPU 102 performs computation and control functions of computer system 101, including executing instructions included in object re-identification 114 (a.k.a. program code 114) to perform a method of re-identifying an object across images captured by multiple cameras, where the instructions are executed by CPU 102 via memory 104. In one embodiment, the CPU 102 executes instructions included in program code 114 to perform a method of re-identifying an object across images captured by multiple cameras. CPU 102 may comprise a single processing unit, or be distributed across one or more processing units in one or more locations (e.g., on a client and server).

Memory 104 may comprise any known computer-readable storage medium, which is described below. In one embodiment, cache memory elements of memory 104 provide temporary storage of at least some program code (e.g., program code 114) in order to reduce the number of times code must be retrieved from bulk storage while instructions of the program code are carried out. Moreover, similar to CPU 102, memory 104 may reside at a single physical location, comprising one or more types of data storage, or be distributed across a plurality of physical systems in various forms. Further, memory 104 can include data distributed across, for example, a local area network (LAN) or a wide area network (WAN).

I/O interface 106 comprises any system for exchanging information to or from an external source. I/O devices 110 comprise any known type of external device, including a display device (e.g., monitor), keyboard, mouse, printer, speakers, handheld device, facsimile, etc. Bus 108 provides a communication link between each of the components in computer system 101, and may comprise any type of transmission link, including electrical, optical, wireless, etc.

I/O interface 106 also allows computer system 101 to store information (e.g., data or program instructions such as program code 114) on and retrieve the information from computer data storage unit 112 or another computer data storage unit (not shown). Computer data storage unit 112 may comprise any known computer-readable storage medium, which is described below. For example, computer data storage unit 112 may be a non-volatile data storage device, such as a magnetic disk drive (i.e., hard disk drive) or an optical disc drive (e.g., a CD-ROM drive which receives a CD-ROM disk).

Memory 104 and/or storage unit 112 may store computer program code 114 that includes instructions that are executed by CPU 102 via memory 104 to re-identify an object across images captured by multiple cameras. In one embodiment, memory 104 and/or storage unit 112 stores program code 114 that includes instructions that are executed by CPU 102 via memory 104 to re-identify an object across images captured by multiple cameras. Although FIG. 1 depicts memory 104 as including program code 114, the present invention contemplates embodiments in which memory 104 does not include all of code 114 simultaneously, but instead at one time includes only a portion of code 114.

Further, memory 104 may include other systems not shown in FIG. 1, such as an operating system (e.g., Linux®) that runs on CPU 102 and provides control of various components within and/or connected to computer system 101.

Storage unit 112 and/or one or more other computer data storage units (not shown) that are coupled to computer system 101 may store training image pairs 116, BTFs 118, test images 120 the weights determined in step 212 (see FIG. 2A), the transformed test image created in step 216 (see FIG. 2B), and/or WBTF 122.

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module". Furthermore, an embodiment of the present invention may take the form of a computer program product embodied in one or more computer-readable storage medium(s) (e.g., memory 104 and/or computer data storage unit 112) having computer-readable program code (e.g., program code 114) embodied or stored thereon.

Any combination of one or more computer-readable storage mediums (e.g., memory 104 and computer data storage unit 112) may be utilized. In one embodiment, the computer-readable storage medium is a computer-readable storage device or computer-readable storage apparatus. A computer-readable storage medium may be, for example, an electronic, magnetic, optical, electromagnetic, disk storage, or semi-conductor system, apparatus, device or any suitable combination of the foregoing. A non-exhaustive list of more specific examples of the computer-readable storage medium includes: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium is a tangible medium that can store a program (e.g., program 114) for use by or in connection with a system, apparatus, or device for carrying out instructions. However, the terms "computer-readable storage medium" and "computer-readable storage device" do not encompass a propagation medium.

Program code (e.g., program code 114) may be transmitted using any appropriate medium, including but not limited to wireless, wireline, optical fiber cable, radio frequency (RF), etc., or any suitable combination of the foregoing.

Computer program code (e.g., program code 114) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Java and all Java-based trademarks and logos are trademarks or registered trademarks of Oracle and/or its affiliates. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 101 or another computer system (not shown) having components analogous to the components of computer system 101 included in FIG. 1. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to a flowchart illustration (e.g., FIGS. 2A-2B) and/or block diagrams of methods, apparatus (systems) (e.g., FIG. 1), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 114). These computer program instructions may be provided to one or more hardware processors (e.g., CPU 102) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowchart and/or block diagram block or blocks.

These computer program instructions may also be stored in a computer-readable medium (e.g., memory 104 or computer data storage unit 112) that can direct a computer (e.g., computer system 101), other programmable data processing apparatus, or other devices to function in a particular manner, such that the instructions (e.g., instructions included in program code 114) stored in the computer-readable storage medium produce an article of manufacture including instructions which implement the function/act specified in the flowchart and/or block diagram block or blocks.

The computer program instructions may also be loaded onto a computer (e.g., computer system 101), other programmable data processing apparatus, or other devices to cause a series of operational steps to be performed on the computer, other programmable apparatus, or other devices to produce a computer implemented process such that the instructions (e.g., instructions included in program code 114) which are carried out on the computer, other programmable apparatus, or other devices provide processes for implementing the functions/acts specified in the flowchart and/or block diagram block or blocks.

The flowchart in FIGS. 2A-2B and the block diagram in FIG. 1 illustrate the architecture, functionality, and operation of possible implementations of systems, methods, and computer program products according to various embodiments of the present invention. In this regard, each block in the flowchart or block diagrams may represent a module, segment, or portion of code (e.g., program code 114), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of re-identifying a first object in a first test image, the method comprising steps of:
    during a testing mode subsequent to a completion of a training mode, a computer receiving the first test image and subsequently determining respective measures of similarity between the first test image and each of first training images captured by a first camera by (i) estimating a foreground region and a background region of the first test image by segmenting the first test image into segments by using normalized cuts on the first test image in which the first object is centered, the foreground region being initialized using first segments that lie in a center of the first test image and the background region being initialized using second segments that do not lie in the center of the first test image and (ii) determining Bhattacharyya distances between feature representations of the estimated background region of the first test image and respective feature representations of background regions of the first training images, the first test image being captured by the first camera during the testing mode;
    based in part on the Bhattacharyya distances and subsequent to the first test image being captured by the first camera, the computer transforming the first test image which results in a transformed first test image having a brightness that (1) is different from a brightness of the first test image captured by the first camera and (2) matches a brightness of training images captured by a second camera during the training mode, so that an appearance of the transformed first test image resembles an appearance of a capture of the first test image by the second camera, the transformed first test image including the first object which is in the first test image which was captured by the first camera;
    the computer identifying one of the test images captured by the second camera that is closer in appearance to the transformed first test image than other test images captured by the second camera; and
    the computer designating a second object in the identified test image as a re-identification of the first object in the first test image.

2. The method of claim 1, further comprising steps of:
    the computer segmenting the first test image into the foreground region and a first background region, the foreground region including the first object in the first test image captured by the first camera and the first background region not including the first object in the first test image;
    the computer determining respective second background regions of the first training images captured by the first camera;
    the computer determining first feature representations in the first background region of the first test image; and
    the computer determining respective second feature representations in the second background regions,
    wherein the step of determining the measures of similarity includes determining respective measures of similarity between the first feature representations in the first background region of the first test image and each of the second feature representations.

3. The method of claim 2, wherein the step of determining the measures of similarity between the first feature representations and each of the second feature representations includes:
    determining respective measures of similarity between histograms of Red-Green-Blue (RGB), Hue, Saturation and Value (HSV) and YCbCr color features included in the first background region and respective histograms of RGB, HSV and YCbCr color features included in each of the second background regions; and
    determining respective measures of similarity between a Histogram of Oriented Gradients (HOG) describing texture features included in the first background region and respective HOGs describing texture features included in each of the second background regions.

4. The method of claim 2, wherein the step of determining the measures of similarity between the first feature representations and each of the second feature representations includes determining measures of similarity between a first proper subset of first histograms and a second proper subset of second histograms, the first proper subset of first histograms including a proper subset of histograms of RGB, HSV and YCbCr color features and a HOG describing texture features included in the first background region, and the second proper subset of second histograms including a proper subset of histograms of RGB, HSV and YCbCr color features and a HOG describing texture features included in a second background region of a training image captured by the first camera.

5. The method of claim 1, further comprising step of the computer determining weights of the first training images, the weights being determined as inversely proportional to the Bhattacharyya distances, and the weights corresponding to brightness transfer functions, wherein the step of transforming the first test image is based in part on the weights and the brightness transfer functions.

6. The method of claim 1, further comprising steps of:
    during the training mode, the computer determining brightness transfer functions (BTFs) $H_j^i$ by determining $H_j^{-1}(H_i(B_i))$, which is an inverted cumulative histogram, so that $B_j=H_i^j(B_i)$, which transfers a brightness value $B_i$ in an object $O_i$ to a corresponding brightness value $B_j$ in an object $O_j$, wherein object $O_i$ is included in each first training image and object $O_j$ is included in second training images captured by the second camera;
    based on the Bhattacharyya distances, the computer determining weights of the first training images captured by the first camera, the weights corresponding to the BTFs;
    based on the Bhattacharyya distances, the computer determining a weighted brightness transfer function (WBTF) by weighting the BTFs by the corresponding weights and combining the weighted BTFs;

the computer receiving a threshold distance;

the computer receiving K training images captured by the first camera;

the computer determining a first background region of the first test image;

the computer determining respective second background regions of each of the K training images captured by the first camera;

the computer determining first feature representations in the first background region of the first test image; and the computer determining respective second feature representations in each of the second background regions, wherein the step of determining the measures of similarity includes determining K respective Bhattacharyya distances between the first feature representations in the first background region of the first test image and each of the second feature representations, wherein the step of determining the BTFs is performed after the step of determining the K Bhattacharyya distances and includes selecting K BTFs from a plurality of BTFs, so that the K BTFs correspond to the K Bhattacharyya distances and so that each of the K Bhattacharyya distances is less than or equal to the threshold distance, wherein the step of determining the weights includes determining a matching cost $\alpha_k$ corresponding to each of the K BTFs, wherein k=1, . . . , K, and wherein the step of determining the WBTF includes weighting each BTF of the K BTFs by the corresponding $\alpha_k$ and determining a linear combination of the weighted K BTFs.

7. A computer system for re-identifying a first object in a first test image, the computer system comprising:

a CPU;

a computer-readable memory;

a computer-readable, tangible storage device;

first program instructions to receive the first test image and subsequently determine, during a testing mode subsequent to a completion of a training mode, respective measures of similarity between the first test image and each of first training images captured by a first camera by (i) estimating a foreground region and a background region of the first test image by segmenting the first test image into segments by using normalized cuts on the first test image in which the first object is centered, the foreground region being initialized using first segments that lie in a center of the first test image and the background region being initialized using second segments that do not lie in the center of the first test image and (ii) determining Bhattacharyya distances between feature representations of the estimated background region of the first test image and respective feature representations of background regions of the first training images, the first test image being captured by the first camera during the testing mode;

second program instructions to, based in part on the Bhattacharyya distances and subsequent to the first test image being captured by the first camera, transform the first test image which results in a transformed first test image having a brightness that (1) is different from a brightness of the first test image captured by the first camera and (2) matches a brightness of training images captured by a second camera during the training mode, so that an appearance of the transformed first test image resembles an appearance of a capture of the first test image by the second camera, the transformed first test image including the first object which is in the first test image which was captured by the first camera;

third program instructions to identify one of the test images captured by the second camera that is closer in appearance to the transformed first test image than other test images captured by the second camera; and fourth program instructions to designate a second object in the identified test image as a re-identification of the first object in the first test image, wherein the first, second, third, and fourth program instructions are stored on the computer-readable, tangible storage device for execution by the CPU via the computer-readable memory.

8. The computer system of claim 7, further comprising:

fifth program instructions to segment the first test image into the foreground region and a first background region, the foreground region including the first object in the first test image captured by the first camera and the first background region not including the first object in the first test image;

sixth program instructions to determine respective second background regions of the first training images captured by the first camera;

seventh program instructions to determine first feature representations in the first background region of the first test image; and eighth program instructions to determine respective second feature representations in the second background regions, wherein the first program instructions to determine the measures of similarity include ninth program instructions to determine respective measures of similarity between the first feature representations in the first background region of the first test image and each of the second feature representations, and wherein the fifth, sixth, seventh, eighth, and ninth program instructions are stored on the computer-readable, tangible storage device for execution by the CPU via the computer-readable memory.

9. The computer system of claim 8, wherein the ninth program instructions to determine the measures of similarity between the first feature representations and each of the second feature representations include:

tenth program instructions to determine respective measures of similarity between histograms of RGB, HSV and YCbCr color features included in the first background region and respective histograms of RGB, HSV and YCbCr color features included in each of the second background regions; and eleventh program instructions to determine respective measures of similarity between a HOG describing texture features included in the first background region and respective HOGs describing texture features included in each of the second background regions, wherein the tenth and eleventh program instructions are stored on the computer-readable, tangible storage device for execution by the CPU via the computer-readable memory.

10. The computer system of claim 8, wherein the ninth program instructions to determine the measures of similarity between the first feature representations and each of the second feature representations include tenth program instructions to determine measures of similarity between a first proper subset of first histograms and a second proper subset of second histograms, the first proper subset of first histograms including a proper subset of histograms of RGB, HSV and YCbCr color features and a HOG describing texture features included in the first background region, and the second proper subset of second histograms including a proper subset of histograms of RGB, HSV and YCbCr color features and a HOG describing texture features included in a second background region of a training image captured by the first camera, wherein the tenth program instructions are stored on the computer-readable, tangible storage device for execution by the CPU via the computer-readable memory.

11. The computer system of claim 7, further comprising fifth program instructions to determine weights of the first training images, the weights being determined as inversely proportional to the Bhattacharyya distances, and the weights corresponding to brightness transfer functions, wherein the second program instructions to transform the first test image include sixth program instructions to transform the first test image into the transformed first test image based in part on the weights and the brightness transfer functions, wherein the fifth and sixth program instructions are stored on the computer-readable, tangible storage device for execution by the CPU via the computer-readable memory.

12. The computer system of claim 7, further comprising:

fifth program instructions to determine, during the training mode, brightness transfer functions (BTFs) $H_i^j$ by determining $H_j^{-1}(H_i(B_i))$, which is an inverted cumulative histogram, so that $B_j=H_i^j(B_i)$, which transfers a brightness value $B_i$ in an object $O_i$ to a corresponding brightness value $B_j$ in an object $O_j$, wherein object $O_i$ is included in each first training image and object $O_j$ is included in second training images captured by the second camera;

sixth program instructions to determine, based on the Bhattacharyya distances, weights of the first training images captured by the first camera, the weights corresponding to the BTFs;

seventh program instructions to determine, based on the Bhattacharyya distances, a weighted brightness transfer function (WBTF) by weighting the BTFs by the corresponding weights and combining the weighted BTFs;

eighth program instructions to receive a threshold distance;

ninth program instructions to receive K training images captured by the first camera;

tenth program instructions to determine a first background region of the first test image;

eleventh program instructions to determine respective second background regions of each of the K training images captured by the first camera;

twelfth program instructions to determine first feature representations in the first background region of the first test image; and thirteenth program instructions to determine respective second feature representations in each of the second background regions, wherein the first program instructions to determine the measures of similarity includes fourteenth program instructions to determine K respective Bhattacharyya distances between the first feature representations in the first background region of the first test image and each of the second feature representations, wherein the fifth program instructions to determine the BTFs includes fifteenth program instructions to determine the BTFs after determining the K Bhattacharyya distances by an execution of the first program instructions and sixteenth program instructions to select K BTFs from a plurality of BTFs, so that the K BTFs correspond to the K Bhattacharyya distances and so that each of the K Bhattacharyya distances is less than or equal to the threshold distance, wherein the sixth program instructions to determine the weights includes seventeenth program instructions to determine a matching cost $\alpha_k$ corresponding to each of the K BTFs, wherein k=1, . . . , K, wherein the seventh program instructions to determine the WBTF includes eighteenth program instructions to weight each BTF of the K BTFs by the corresponding $\alpha_k$ and nineteenth program instructions to determine a linear combination of the weighted K BTFs, and wherein the fifth, sixth, seventh, eighth, ninth, tenth, eleventh, twelfth, thirteenth, fourteenth, fifteenth, sixteenth, seventeenth, eighteenth, and nineteenth program instructions are stored on the computer-readable, tangible storage device for execution by the CPU via the computer-readable memory.

13. A computer program product for re-identifying a first object in a first test image, the computer program product comprising:

computer-readable storage device(s) which are not signals or propagation media; and computer-readable program instructions stored on the computer-readable storage device(s), the computer-readable program instructions when executed by a CPU:

receive the first test image and subsequently determine, during a testing mode subsequent to a completion of a training mode, respective measures of similarity between the first test image and each of first training images captured by a first camera by (i) estimating a foreground region and a background region of the first test image by segmenting the first test image into segments by using normalized cuts on the first test image in which the first object is centered, the foreground region being initialized using first segments that lie in a center of the first test image and the background region being initialized using second segments that do not lie in the center of the first test image and (ii) determining Bhattacharyya distances between feature representations of the estimated background region of the first test image and respective feature representations of background regions of the first training images, the first test image being captured by the first camera during the testing mode;

based in part on the Bhattacharyya distances and subsequent to the first test image being captured by the first camera, transform the first test image which results in a transformed first test image having a brightness that (1) is different from a brightness of the first test image captured by the first camera and (2) matches a brightness of training images captured by a second camera during the training mode, so that an appearance of the transformed first test image resembles an appearance of a capture of the first test image by the second camera, the transformed first test image including the first object which is in the first test image which was captured by the first camera;

identify one of the test images captured by the second camera that is closer in appearance to the transformed first test image than other test images captured by the second camera; and designate a second object in the identified test image as a re-identification of the first object in the first test image.

14. The computer program product of claim 13, wherein the computer-readable program instructions, when executed by the CPU:
   segment the first test image into the foreground region and a first background region, the foreground region including the first object in the first test image captured by the first camera and the first background region not including the first object in the first test image;
   determine respective second background regions of the first training images captured by the first camera;
   determine first feature representations in the first background region of the first test image; and
   determine respective second feature representations in the second background regions,
   wherein the computer-readable program instructions that determine the measures of similarity include computer-readable program instructions that, when executed by the CPU, determine respective measures of similarity between the first feature representations in the first background region of the first test image and each of the second feature representations.

15. The computer program product of claim 14, wherein the computer-readable program instructions that determine the measures of similarity between the first feature representations and each of the second feature representations include computer-readable program instructions that, when executed by the CPU:
   determine respective measures of similarity between histograms of RGB, HSV and YCbCr color features included in the first background region and respective histograms of RGB, HSV and YCbCr color features included in each of the second background regions; and
   determine respective measures of similarity between a HOG describing texture features included in the first background region and respective HOGs describing texture features included in each of the second background regions.

16. The computer program product of claim 14, wherein the computer-readable program instructions that determine the measures of similarity between the first feature representations and each of the second feature representations include computer-readable program instructions that, when executed by the CPU, determine measures of similarity between a first proper subset of first histograms and a second proper subset of second histograms,
   the first proper subset of first histograms including a proper subset of histograms of RGB, HSV and YCbCr color features and a HOG describing texture features included in the first background region, and
   the second proper subset of second histograms including a proper subset of histograms of RGB, HSV and YCbCr color features and a HOG describing texture features included in a second background region of a training image captured by the first camera.

17. The computer program product of claim 13, wherein the computer-readable program instructions, when executed by the CPU, determine weights of the first training images, the weights being determined as inversely proportional to the Bhattacharyya distances, and the weights corresponding to brightness transfer functions, wherein the computer-readable program instructions that transform the first test image include computer-readable program instructions that, when executed by the CPU, transform the first test image into the transformed first test image based in part on the weights and the brightness transfer functions.

18. The computer program product of claim 13, wherein the computer-readable program instructions, when executed by the CPU:
   determine, during the training mode, brightness transfer functions (BTFs) $H_i^j$ by determining $H_j^{-1}(H_i(B_i))$, which is an inverted cumulative histogram, so that $B_j = H_i^j(B_i)$, which transfers a brightness value $B_i$ in an object $O_i$ to a corresponding brightness value $B_j$ in an object $O_j$, wherein object $O_i$ is included in each first training image and object $O_j$ is included in second training images captured by the second camera;
   determine, based on the Bhattacharyya distances, weights of the first training images captured by the first camera, the weights corresponding to the BTFs;
   determine, based on the Bhattacharyya distances, a weighted brightness transfer function (WBTF) by weighting the BTFs by the corresponding weights and combining the weighted BTFs;
   receive a threshold distance;
   receive K training images captured by the first camera;
   determine a first background region of the first test image;
   determine respective second background regions of each of the K training images captured by the first camera;
   determine first feature representations in the first background region of the first test image; and
   determine respective second feature representations in each of the second background regions,
   wherein the computer-readable program instructions that determine the measures of similarity includes computer-readable program instructions that, when executed by the CPU, determine K respective Bhattacharyya distances between the first feature representations in the first background region of the first test image and each of the second feature representations,
   wherein the computer-readable program instructions that determine the BTFs includes computer-readable program instructions that, when executed by the CPU, determine the BTFs after a determination of the K Bhattacharyya distances by an execution of computer-readable program instructions that determine the K Bhattacharyya distances, and computer-readable program instructions that, when executed by the CPU, select K BTFs from a plurality of BTFs, so that the K BTFs correspond to the K Bhattacharyya distances and so that each of the K Bhattacharyya distances is less than or equal to the threshold distance,
   wherein the computer-readable program instructions that determine the weights includes computer-readable program instructions that, when executed by the CPU, determine a matching cost $\alpha_k$ corresponding to each of the K BTFs, wherein k=1, ..., K,
   wherein the computer-readable program instructions that determine the WBTF includes computer-readable program instructions that, when executed by the CPU, weight each BTF of the K BTFs by the corresponding $\alpha_k$ and computer-readable program instructions that, when executed by the CPU, determine a linear combination of the weighted K BTFs.

* * * * *